(12) United States Patent
Moreni et al.

(10) Patent No.: US 12,515,425 B2
(45) Date of Patent: Jan. 6, 2026

(54) ADAPTER RING FOR AN OPTICAL ELEMENTS HOLDER DEVICE AND A RELATED OPTICAL ELEMENTS HOLDER DEVICE

(71) Applicant: SATISLOH AG, Baar (CH)

(72) Inventors: Franco Moreni, Milan (IT); Giuseppe Di Paola, Baar (CH); Antonio Corea, Milan (IT); Fabio Congia, Bollate (IT); Gero Antonio Bongiorno, Cisliano (IT)

(73) Assignee: SATISLOH AG, Baar (CH)

( * ) Notice: Subject to any disclaimer, the term of this patent is extended or adjusted under 35 U.S.C. 154(b) by 0 days.

(21) Appl. No.: 18/361,239

(22) Filed: Jul. 28, 2023

(65) Prior Publication Data

US 2024/0034012 A1 Feb. 1, 2024

(30) Foreign Application Priority Data

Jul. 29, 2022 (EP) .................................. 22187927

(51) Int. Cl.
*G02B 7/02* (2021.01)
*B05C 13/02* (2006.01)
*B29D 11/00* (2006.01)

(52) U.S. Cl.
CPC ........ *B29D 11/00923* (2013.01); *B05C 13/02* (2013.01); *G02B 7/021* (2013.01); *G02B 7/026* (2013.01)

(58) Field of Classification Search
USPC .................................... 118/728, 500, 503, 50
See application file for complete search history.

(56) References Cited

U.S. PATENT DOCUMENTS

| 5,124,019 A * | 6/1992 | Kunkel ................. C23C 14/505 118/729 |
| 5,138,974 A * | 8/1992 | Ciparisso .............. C23C 14/505 118/500 |
| 2016/0281210 A1 | 9/2016 | Boulineau et al. |
| 2021/0172058 A1* | 6/2021 | Bongiorno ......... B29D 11/0074 |

FOREIGN PATENT DOCUMENTS

JP 6357669 B2 7/2018

OTHER PUBLICATIONS

European Search Report issued Jan. 25, 2023 in European Application 22187927.3 filed on Jul. 29, 2022, 8 pages (with Written Opinion).

\* cited by examiner

*Primary Examiner* — Yewebdar T Tadesse
(74) *Attorney, Agent, or Firm* — Oblon, McClelland, Maier & Neustadt, L.L.P.

(57) ABSTRACT

The present invention refers to an optical elements holder device (11) for a coating station (5) comprising at least one sheet carrier (21) having individual openings (23), said opening (23) having in its inner face at least one shoulder (25) configured to hold an optical element (3) such as lenses during a coating procedure, said sheet carrier (21) presenting the shape of a dome or a part of a dome which is mounted above a vaporization source (9) so that the optical elements (3) are oriented towards said vaporization source (9), wherein it also comprises at least one adapter ring (31*b*) comprising an outer portion (33) configured to be supported by the at least one shoulder (25) of the opening (23) of the sheet carrier (21).

9 Claims, 4 Drawing Sheets

ADAPTER RING FOR AN OPTICAL ELEMENTS HOLDER DEVICE AND A RELATED OPTICAL ELEMENTS HOLDER DEVICE

TECHNICAL FIELD

The present invention relates to an adapter ring for an optical element holder device for a coating station configured for carrying out a coating on optical elements such as ophthalmic lenses within a vacuum chamber and a related optical elements holder device.

BACKGROUND OF THE INVENTION

Most of nowadays manufactured ophthalmic lenses have at least one coating which gives it special properties. Generally speaking, the performance and durability of a lens is largely determined by the applied coating package.

An ophthalmic lens is usually coated with a standard durable hard coating which ensures scratch resistance. On top of this hard coating, there is usually a standard anti-reflection coating or a stack of anti-reflective coating which affects the optical properties of the lens, like transmission and/or selective light filtering for instance. The hard coating also ensures a high adhesion of the stack of anti-reflective coating. On top of said stack of anti-reflective coating, there is usually a standard top coating designed to repel polluting elements and to facilitate maintenance, such as cleaning. Additionally, there can be a special temporary grip coating on top of the top coating. Other types of coating include shockproof coating, anti-abrasion coating, anti-fouling coating, anti-fogging coating and/or anti-static coating.

Such coatings are carried out in a coating station, also known as box coater, which usually comprises a vacuum chamber. On the bottom of the vacuum chamber is disposed a vaporization source. During the coating process, a vaporization material is heated, for example by an electric heating device or an electron beam source, in order to evaporate or sublimate the vaporization material that will be deposited on the ophthalmic lenses.

Such a coating station further comprises an optical elements holder device which itself comprises one or several sheet carriers, which, for practical reasons, are generally in the form of sectors forming a concave cap or dome that may present a spherical shape. The sheet carrier contains a plurality of individual openings, shaped like receptacles, which are destined to hold the optical elements (ophthalmic lenses) during the coating process. The sheet carriers forming the dome are mounted above the vaporization source so that one side of the optical elements is facing toward said source.

A crucial parameter for coating is the distance between the vaporization source and the surface of the optical elements to be coated. In order that all optical elements will get a coating with the same thickness, the optical elements holder is dome-shaped, thereby ensuring that all optical elements to be coated are equidistant from the vaporization source. In other words, the curvature of the concave dome is characterized by a central zone that is essentially placed in correspondence to the vaporization source.

The optical elements holder is connected to a drive motor configured to rotate the optical elements holder device, so that the dome is rotated about its axis of symmetry by means of a rotation device. Rotation of the optical elements holder device during coating ensures averaging spatial inhomogeneity of the vaporization cone during coating.

The number of optical elements that the dome can host defines the capacity of the coating station. The design of such a dome can be defined based on the diameters and the overall shape of the optical elements while also taking into account laboratories production specifications.

There are different ways to secure the optical elements in the individual openings of the sheet carriers. In mass production for instance, the optical elements usually all have standard dimensions, which implies that they all have the same shape and the same diameter. In this case, the optical elements can be inserted directly inside the individual openings which are designed to receive optical elements with a standard diameter. This allows to maximize the capacity of the dome for a specific type of optical elements with a standard diameter. In the state of the art, classical optical lenses from mass production have for instance a fixed standard diameter of 70 mm. However, a change from one standard diameter (such as 70 mm) to another standard diameter (such as a smaller diameter, for instance 65 mm) would require the exchange of all the sectors forming the dome in order to accommodate the new standard diameter, which can be quite time consuming.

However, sometimes, optical elements having different geometrical shapes and/or sizes also need to be coated and in order to optimize the manufacturing process, the same concave dome shall be used. Sometimes, the optical elements to be coated have a varying diameter, meaning that they do not have a circular shape, but an elliptical shape for instance. In order to apply a coating on these particular optical elements, it is possible to equip the optical elements holder with additional parts that can accommodate to these variable diameters and/or shapes. In order to fulfil their role, it is important that these parts exert a force towards the inside of the opening, preferably in a concentric manner, so that centre of the optical element is aligned with the centre of the opening and so that the optical element is securely fixed inside the opening despite its non-standard shape. For instance, flexible springs shaped like clamping arms may be used for holding optical elements having an elliptical shape within the individual openings of the sheet carrier forming the dome inside the vacuum chamber of the box coater. However, a major disadvantage of using these flexible springs is the increased weight of the dome.

In order to secure optical elements having a non-standard diameter inside the individual openings of the sheet carrier, adapter rings, which are also called "reduction rings", may be used for holding these optical elements during the coating process inside the vacuum chamber of the box coater. These adapter rings have an external diameter equivalent to the diameter of the openings of the sheet carrier and an internal diameter correspondent to the outer diameter of the optical element that they are designed to hold. In this particular configuration, the individual openings are not in direct contact with the optical elements. Each adapter ring is placed inside an opening and an optical element is then placed inside said ring.

Thus, for each lens diameter, an adapter ring with the corresponding internal diameter must be used. For instance, adapter rings configured to bridge the gap between two standardized diameters, such as a gap between a lens having an outer diameter of 65 mm for example and an individual opening which has a diameter of 70 mm, are fitted into the openings of the sheet carrier forming the sectors and/or the full dome. This avoids the need to change all the sectors forming the concave dome, as mentioned previously.

However, when using such known adapter rings, the distance from the optical elements placed in the adapter ring to the vaporization source is not the same as for optical elements placed directly in an opening of the sheet carrier, which results in that the coating, in particular its thickness, is affected. More specifically, the use of such known adapter rings for holding these specific optical elements introduces a gap in the distance between the surface of said optical elements to be coated and the vaporization source, which may affect the coating uniformity on the surface of said optical elements, especially when both optical elements having a standard diameter and optical elements having a non-standard diameter and/or shape have to be coated during a same cycle.

To illustrate this problem in more detail, FIG. 1 shows a schematic view in cross-section of two optical elements 3 being held within individual openings 23 of a sheet carrier 21 with an adapter ring 31a as known from the prior art. As can be seen on this FIG. 1, the optical element 3 on the right-hand-side is an ophthalmic lens having a circular shape and a standard diameter. This ophthalmic lens is inserted directly into the receptacle formed by an individual opening 23 in the sheet carrier 21. More specifically, the outer edge of the optical element 3 lies on at least one shoulder 25 of the opening 23 of the sheet carrier 21. The term "shoulder" may refer to a change in the cross-section of the edge of the opening 23. The shoulder 25 provides a face for supporting the outer edge of the optical element 3.

Furthermore, the optical element 3 on the left-hand-side is an ophthalmic lens having a non-standard diameter. More specifically, the diameter of this ophthalmic lens is smaller than the diameter Do of the individual opening 23. An adapter ring 31a is therefore needed to hold this special optical element 3 within the opening 23 of the sheet carrier 21.

The adapter ring 31a known from the state of the art comprises an outer portion 33 configured to be supported by the shoulder 25 of the opening 23 of the sheet carrier 21. The adapter ring 31a known from the state of the art also comprises an inner support portion 35, usually shaped like a shoulder, which is configured to support the optical element 3 having a diameter smaller than the opening 23. However, the face of this shoulder-shaped inner support portion 35 does not lie on the same level as the outer portion 33 of the adapter ring 31a. This shift between the levels of is clearly visible in FIG. 1: the outer edge of the optical element 3 on the left-hand-side lies on a lower level than the outer edge of the optical element 3 on the right-hand-side which lies on the shoulder 25 of the opening 23 of the sheet carrier 21.

In other words, when the optical element 3 having a non-standard size is supported by the shoulder-shaped inner support portion 35 of the adapter ring 31a known from the state of the art, and when said adapter ring 31a is inserted into the receptacle formed by the individual opening 23, the optical element 3 lies closer to the vaporization source 9 placed on the bottom of the vacuum chamber 7 than the optical element 3 having a standard size which does not need the adapter ring 31a to fit within the opening 23 of the sheet carrier 21. This means that when such an adapter ring 31a known from the state of the art is used to carry an optical element 3 having a non-standard diameter, the distance between said vaporization source 9 and the surface of said optical element 3 to be coated is not the same as the distance between the vaporization source 9 and an optical element 3 having a standard diameter which is directly supported by the shoulder 25 of the individual opening 23 in the sheet carriers 21.

It is a goal of the invention to overcome at least partially the previous drawbacks of the state of the art and to offer a way to find a balance between an optimized capacity level of the coating station and the limitations in flexibility brought by the means of fixing the various types of optical elements in the individual openings of the sheet carrier. It is also a goal of the invention to provide a solution to ensure that the surface of all optical elements to be coated during a same coating cycle are as much as possible equidistant to the vaporization source, regardless of the geometry of said optical elements, in order to obtain a uniform coverage for all optical elements during a same coating process.

SUMMARY OF THE INVENTION

To this extent, the present invention proposes an optical elements holder device for a coating station comprising at least one sheet carrier having individual openings, said opening having in its inner face at least one shoulder configured to hold an optical element such as lenses during a coating procedure, said sheet carrier presenting the shape of a dome or a part of a dome which is mounted above a vaporization source so that the optical elements are oriented towards said vaporization source, wherein it also comprises at least one adapter ring comprising an outer portion configured to be supported by the at least one shoulder of the opening of the sheet carrier and wherein the adapter ring also comprises an inner support portion configured to support an optical element having a diameter smaller than the diameter of the opening, where when inserted in the opening of the sheet carrier, the inner support portion of the adapter ring is at the same level as the shoulder of the opening of the sheet carrier.

According to a further aspect of the invention, the inner support portion of the adapter ring comprises at least one shoulder, which presents a face for supporting at least part of the outer edge of the optical element, said face being at the same level as the shoulder of the opening of the sheet carrier when the adapter ring is inserted in the opening.

According to a further aspect of the invention, the width of the face of the shoulder-shaped inner support portion is larger than or equal to the width of the outer portion of the adapter ring.

According to a further aspect of the invention, the height of the adapter ring is less than or equal to the depth of the individual opening of the sheet carrier in which the adapter ring is destined to be mounted.

According to a further aspect of the invention, the adapter ring comprises a circumferential groove on the outer portion.

According to a further aspect of the invention, the inner support portion of the adapter ring comprises several sections that protrude towards the centre of the adapter ring.

According to a further aspect of the invention, the inner support portion of the adapter ring is circular and continuous around the inner periphery of the adapter ring.

According to a further aspect of the invention, the adapter ring can cooperate with flexible elastic elements so as to hold an optical element having a non-standard geometry, wherein the tips of the flexible elastic elements form the inner support portion configured to support the optical element at the same level as the shoulder of the opening of the sheet carrier.

The invention also relates to the use of an adapter ring as defined above with an optical elements holder device for a coating station as defined above.

DETAILED DESCRIPTION OF THE INVENTION

The following embodiments are examples. Although the specification refers to one or several embodiments, it does not imply that each reference refers to the same embodiment or that the features apply only to a single embodiment. Single features of different embodiments can also be combined to provide other embodiments. In the following description, certain items can be indexed, as the first item or second item. This is a simple indexing to differentiate and name similar but not identical elements. This indexing does not imply a priority of one element over another and such names can easily be interchanged without going beyond the scope of the present description. Nor does this indexing imply an order in time.

Figure 2:
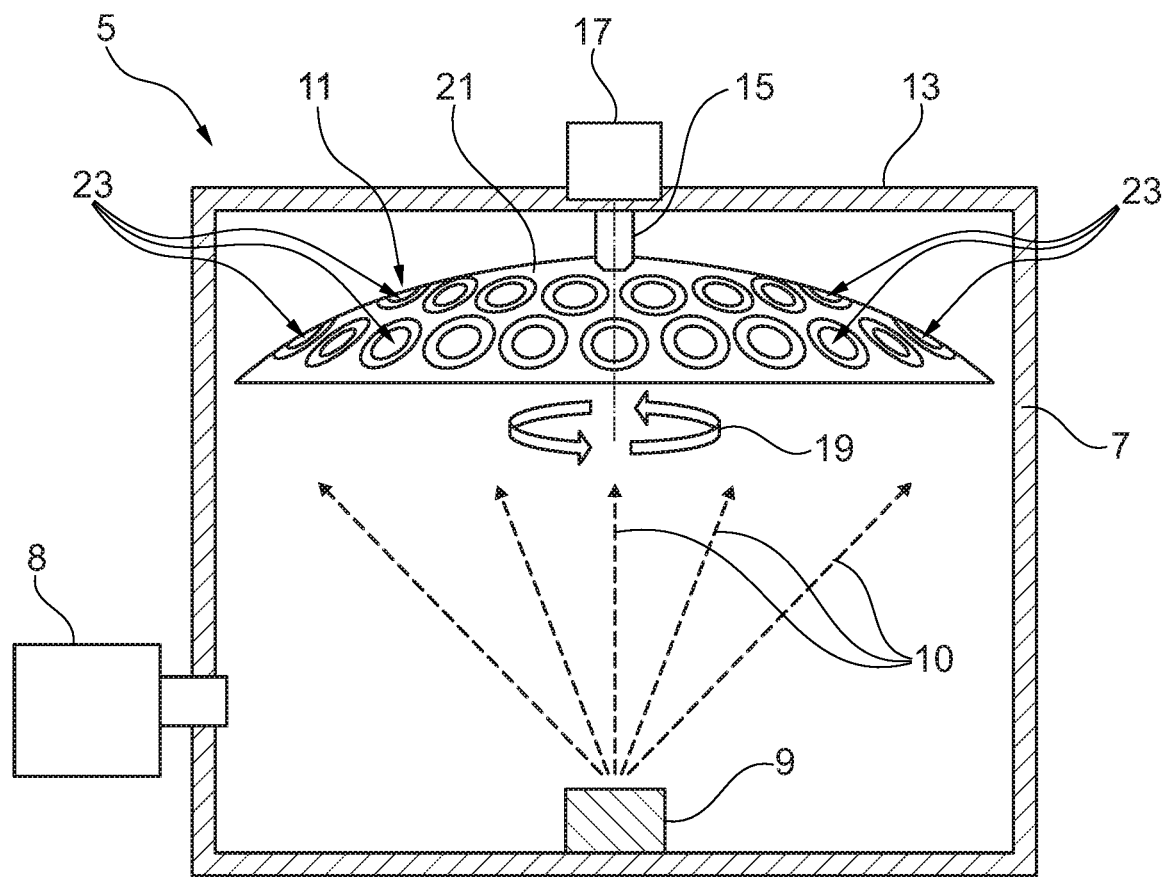
FIG. 2 is a schematic cross section of a coating station according to the invention.

On FIG. 2 is depicted a schematic cross section of a coating station 5. The coating station 5 comprises a vacuum chamber 7 that is connected to a vacuum pump system 8. On the bottom of the vacuum chamber 7 is disposed a vaporization source 9. The vaporization source can be an electron beam evaporation center for instance. During the coating process, a not shown vaporization material is heated, for example by an electric heating device, in order to evaporate or sublimate the vaporization material (schematically shown by the dotted arrows 10 in FIG. 2).

Figure 1:
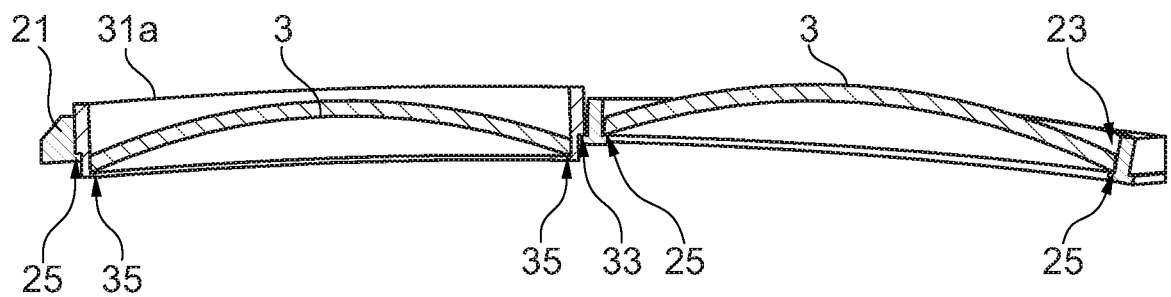
FIG. 1 is a schematic view in cross-section of two optical elements being held within individual openings of a sheet carrier with an adapter ring as known from the prior art.

The coating station 5 further comprises an optical elements holder device 11 which is hanging from the top wall 13 of the vacuum chamber 7. The optical elements holder device 11 is connected, through a rotation axis 15, to a drive motor 17 configured to rotate the optical elements holder device 11, as depicted by the arrows 19 on FIG. 1.

Figure 3:
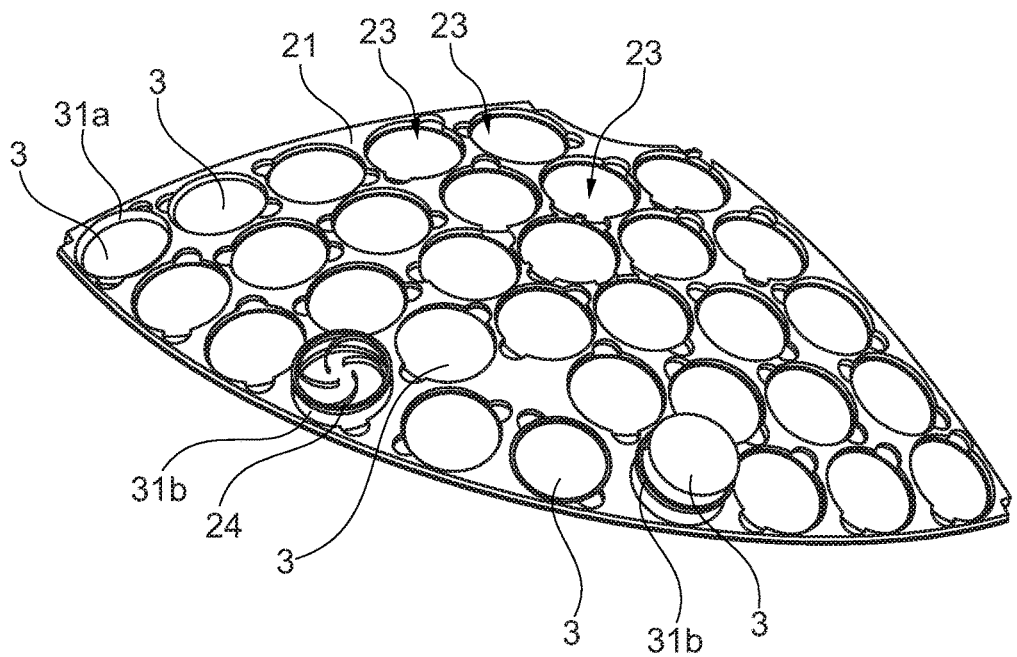
FIG. 3 is a schematic representation in perspective of a sheet carrier displaying various types of adapter rings.

The optical elements holder device 11 comprises one or several sheet carriers 21. Such a sheet carrier 21 is shown in more detail in FIG. 3. The sheet carrier 21 illustrated in FIG. 3 is for instance a sheet carrier made of metal and having a plurality of individual openings 23, such as circular holes shaped like individual receptacles. These individual openings 23 are configured to hold optical elements 3 such as ophthalmic lenses during a coating process. For practical reasons, the sheet carrier 21 has the shape of a sector. A plurality of these sector-shaped sheet carriers arranged edge to edge form a concave dome, a shape which puts all the optical elements 3 inserted in the individual openings at essentially the same distance with respect to the vaporization source 9.

The individual openings 23 are spread over the sheet carrier 21, preferably in a manner that contributes to an even weight distribution within the sheet carrier 21. In order to facilitate the mounting of the optical elements 3 inside the individual openings 23 while optimising the weight distribution within the sheet carrier 21, some of the individual openings 23 may have a distinctive marking, which makes them easier to spot when mounting the different types of lenses on the sheet carrier. Most of the individual openings 23 of the sheet carrier 21 depicted in FIG. 3 are empty, for the sake of simplicity, but some of them host various types of optical elements 3. Normally all openings are filled with optical lenses during the coating process.

Some of the optical elements 3 depicted in FIG. 3 have a standard diameter, which means that they fit well into the individual openings 23 of the sheet carrier 21, while other optical elements 3 depicted in FIG. 3 have a non-standard diameter, which means that an additional adapter ring 31b must be used to hold these particular optical elements 3 inside the openings 23 of the sheet carrier 21, mostly because the outer diameter of these optical elements 3 is smaller than the diameter Do of the individual openings 23.

The adapter ring 31b has an external diameter Dext equivalent to the diameter Do of the individual openings 23, so that the adapter ring 31b can fit securely inside the individual opening 23 when inserted therein. The adapter ring 31b also has an internal diameter Dint correspondent to outer diameter of the optical element 3. Each adapter ring 31b is placed on a shoulder 25 having a diameter Dso inside the individual opening 23 and an optical element 3 is then placed inside said adapter ring 31b so as to be supported by its inner support portion 35, as it is illustrated in FIG. 3.

A crucial parameter for coating is the distance between the vaporization source 9 and the optical element 3 to be coated. In other words, it is important to make sure that all optical elements 3 carried by the optical elements holder device 11 are equidistant from the vaporization source 9, regardless of the geometry of said optical elements 3 and regardless of their need for an adapter ring 31b.

Figure 4:
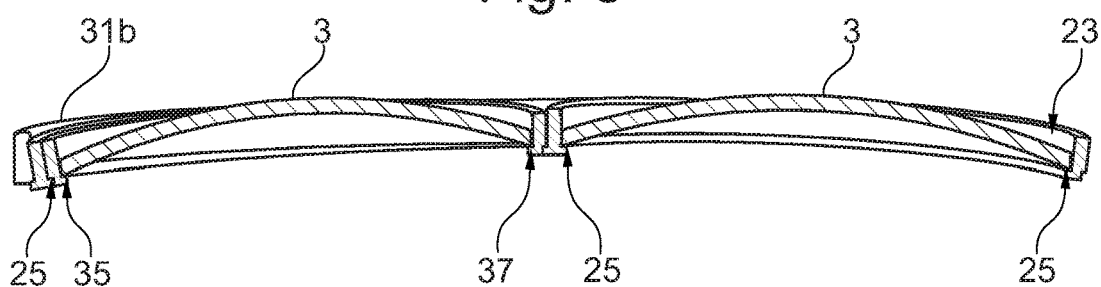
FIG. 4 is a schematic view in cross-section of two optical elements being held within individual openings of a sheet carrier with an adapter ring according to the invention.

Therefore, the design of the adapter ring 31b according to the invention varies from the design of the adapter ring 31a known from the prior art in that when it is inserted in the opening 23 of the sheet carrier 21, the inner support portion 35 of this adapter ring 31b is at the same level as the shoulder 25 of the opening 23 of the sheet carrier 21, as shown in particular in FIG. 4.

FIG. 4 shows on the right-hand-side an optical element 3 having a standard diameter inserted directly into the receptacle formed by the individual opening 23 in the sector-shaped sheet carrier 21 and on the left-hand-side an optical element 3 having a non-standard diameter which is inserted into an adapter ring 31b in which the inner support portion 35 is at the same level as the shoulder 25 of the opening 23 of the sheet carrier 21, so that the edge of both optical elements 3 (standard diameter on the right and non-standard diameter on the left) lie on a same level, so that they are equidistant from the vaporization source 9 (not illustrated on FIG. 4). Aligning the inner support portion 35 of the adapter ring 31b with the shoulder 25 of the opening 23 of the sheet carrier 21 thus prevents a change in the distance between the vaporization source 9 and the surface of the optical element 3 having a non-standard diameter to be coated.

Figure 5:
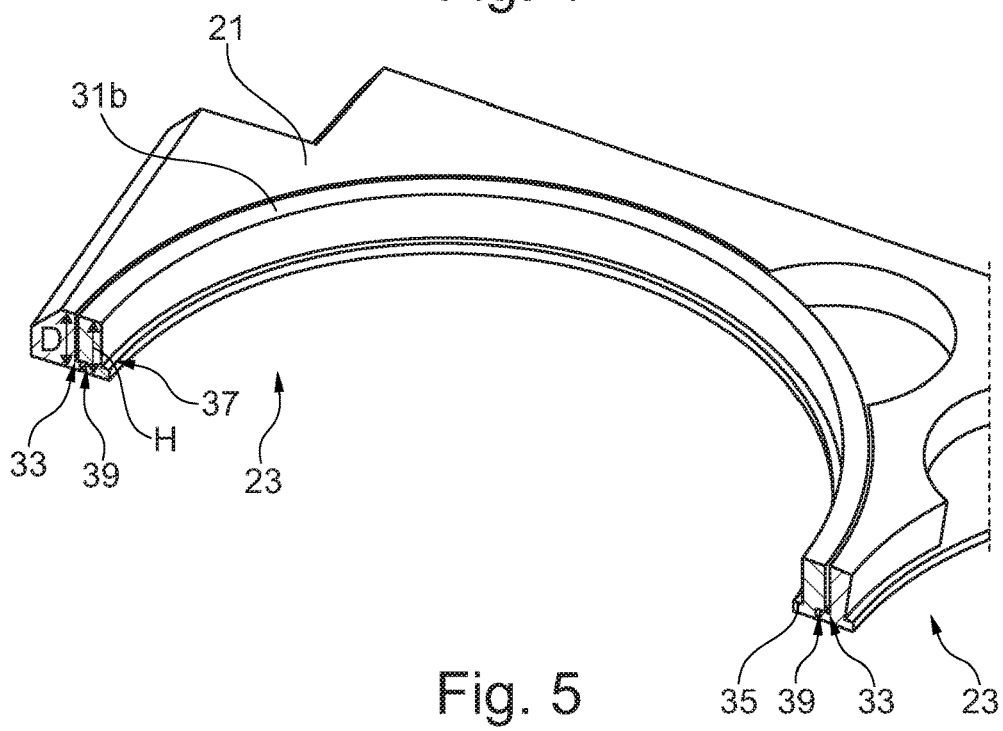
FIG. 5 is a schematic view in perspective and in cross section of a part of a sheet carrier and an adapter ring according to the invention placed inside an individual opening of said sheet carrier.
Figure 6:
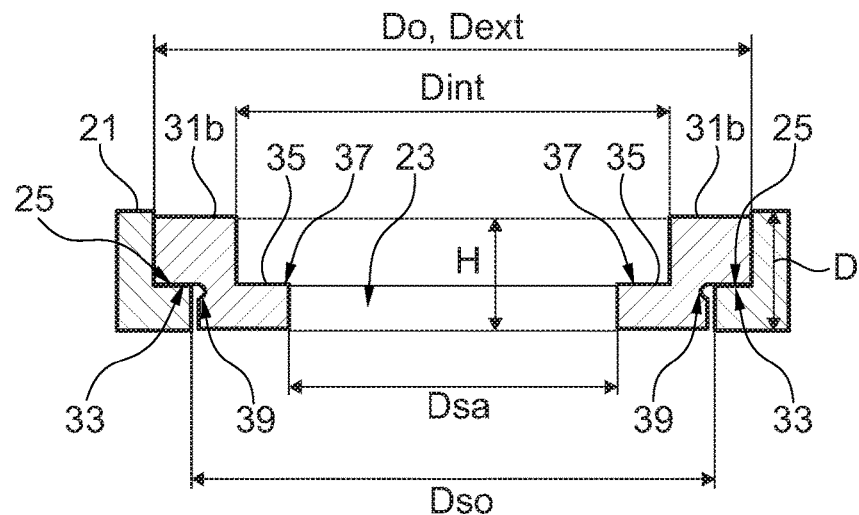
FIG. 6 is a schematic view in cross-section of a specific embodiment of an adapter ring according to the invention.

As illustrated in FIGS. 4 and 5, its inner support portion 35 could have the shape of a shoulder, wherein said shoulder has a diameter Dsa (see FIG. 6). This shoulder-shaped inner support portion 35 presents a face 37 for supporting at least part of the outer edge of the optical element 3. This face 37 lies on the same level as the shoulder 25 of the opening 23 of the sheet carrier 21 when the adapter ring 31b is inserted in the opening 23. An inner support portion 35 having the shape of a shoulder provides a continuous circular contact face 37 between the adapter ring 31b and the optical element 3 it is configured to hold. More specifically, the width of this circular contact face 37 may be defined by the extend between the internal diameter Dint of the adapter ring 31b and the diameter Dsa of the shoulder-shaped inner support portion 35 of said adapter ring 31b, as shown in FIG. 6 for instance.

The width of the face 37 of the shoulder-shaped inner support portion 35 of the adapter ring 31b is preferably larger than or equal to the width of the outer portion 33 of said adapter ring 31b. The width of the outer portion 33 may be defined by the extend between the external diameter Dext and the diameter Dso of the shoulder 25 of the individual opening 23. A larger width of the face 37 helps securing the optical element 3 by providing additional support without too much gain in weight. So even if the centre of the optical element 3 is not exactly aligned with the centre of the adapter ring 31b or if the centre of the adapter ring 31b is not exactly aligned with the centre of the individual opening 23, the optical element 3 is still supported in a secured way by the shoulder 35 of the adapter ring 31b. However, the width of the face 37 must not be too large, otherwise the face 37 produces a coating shadow over the edge of the lenses. A coating shadow refers to an area that is difficult to access for the vaporization material coming from the vaporization source 9.

The adapter ring 31b may also comprises a circumferential groove 39 on the outer portion 33 the ring 31b. The circumferential groove 39 is for instance visible in FIG. 6. Such a circumferential groove 39 facilitates the insertion and the extraction of the adapter ring 31b within the individual opening 23. An easy assembly or disassembly of the adapter ring 31b inside the individual opening 23 of the sheet carrier 21 helps save time between two consecutive coating cycles, which increases the overall efficiency.

Figure 7:
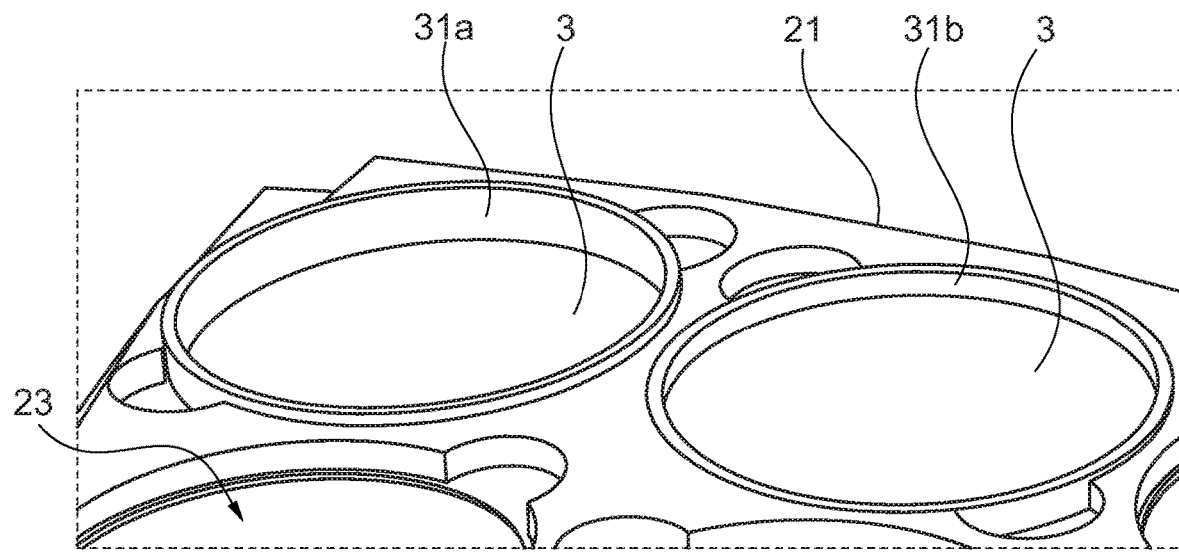
FIG. 7 is a schematic representation in perspective of a part of a sheet carrier with two optical elements being held by two different types of adapter rings within two individual openings of the sheet carrier.

The height H of the adapter ring 31b could be less than or equal to the depth D of the individual opening 23 of the sheet carrier 21 in which the adapter ring 31b is destined to be mounted. Such an adapter ring 31b is for instance illustrated in FIGS. 6 and 7. The example illustrated in FIG. 7 also shows the difference in height between an adapter ring 31a known in the state of the art (visible on the left) and an adapter ring 31b according to a specific embodiment of the invention (visible on the right). The height of the adapter ring 31a known in the state of the art is such that it sticks out from the surface of the sheet carrier 21, whereas the limited height H of the adapter ring 31b according to an embodiment of the invention is such that the entire adapter ring 31b fits inside the receptacle formed by the individual opening 23.

A limited height H of the adapter ring 31b also implies limited material which contributes to a reduction in weight. Using adapter rings 31b that are lighter than the adapter rings 31a known from the prior art contributes to an overall reduction in the weight carried by the sheet carrier 21 in particular and of the optical element holder 11 in general. An adapter ring 31b having a height H that is equal to the depth D of the individual opening 23 of the sheet carrier 21 in which the adapter ring 31b is mounted is also illustrated in FIG. 5.

According to a first embodiment, the inner support portion 35 could be circular, so that it provides a continuous support around the inner periphery of the adapter ring 31b for the outer edge of the optical element 3. In an alternative not shown, the inner support portion 35 could present several sections that protrude towards the centre. These sections may be clearly distinct one from the other.

Figure 8:
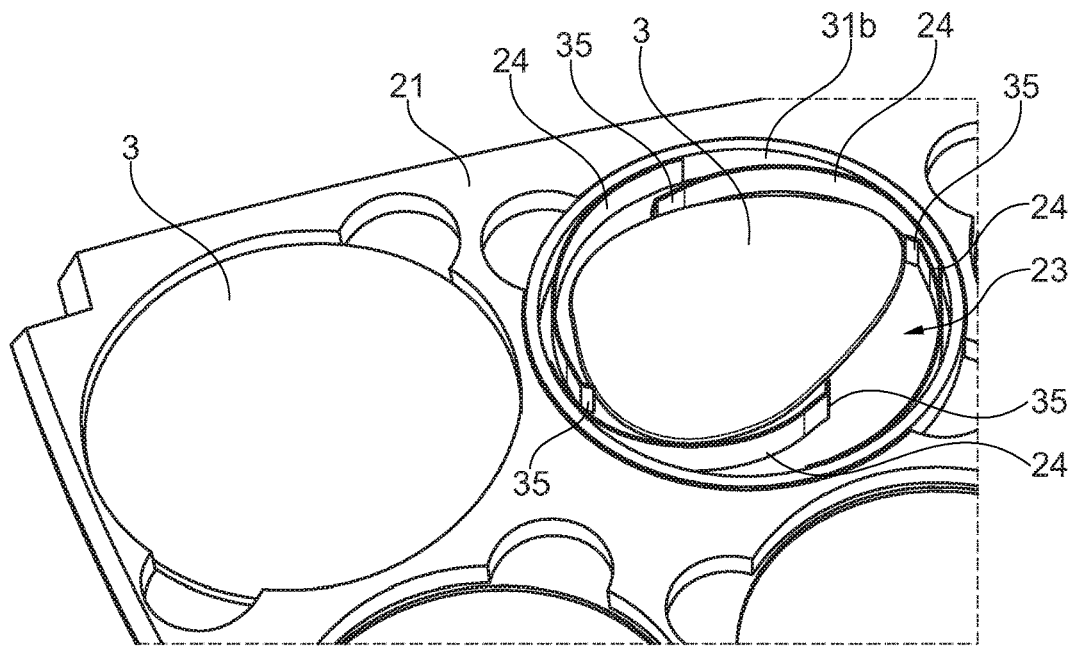
FIG. 8 is another schematic representation in perspective of a part of a sheet carrier with two different optical elements being held within two individual openings of the sheet carrier, wherein an adapter ring according to the invention cooperates with flexible elastic elements so as to hold the optical elements having a non-standard geometry.
Figure 9:
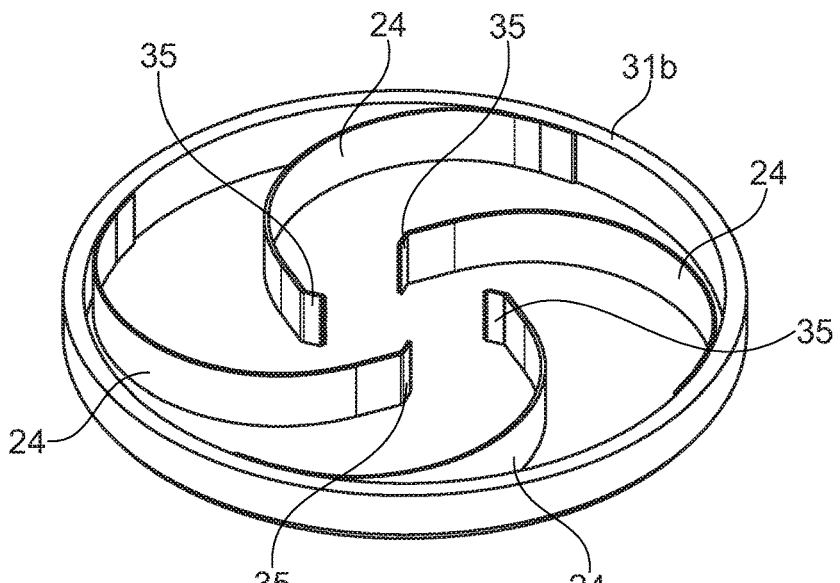
FIG. 9 is a schematic representation in perspective of an adapter ring according to the invention that cooperates with flexible elastic elements configured to hold optical elements having a non-standard geometry.
Figure 10:
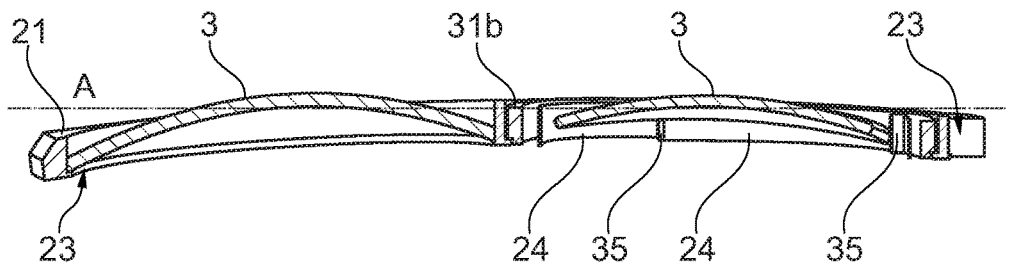
FIG. 10 is another schematic view in cross-section of two optical elements being held within individual openings of a sheet carrier with an adapter ring according to the embodiment illustrated in FIGS. 8 and 9.

According to a second embodiment, the adapter ring 31b can cooperate with flexible elastic elements 24 so as to hold optical elements 3 having a non-standard geometry inside the opening 23 of the sheet carrier 21, as shown in FIG. 8 for instance. This embodiment is also illustrated on FIGS. 9 and 10, which show an adapter ring 31b that is equipped with four distinct flexible elastic elements 24. The four distinct flexible elastic elements 24 may be evenly distributed over the inner diameter of the adapter ring 31b, as illustrated in FIG. 9. In this specific embodiment, the inner support portion 35 configured to support the optical element 3 is formed by the tip of the flexible elastic elements 24. In other words, the tip of the flexible elastic elements 24 may comprise a shoulder or a groove configured to cooperate with the outer edge of the optical element 3 so that the latter is placed at the same level as the shoulder 25 of the opening 23 of the sheet carrier 21 on which the adapter rings 31b is supported. This is for instance illustrated in FIG. 10, which illustrates two different optical elements 3, each being placed in an individual opening 23 of the sheet carrier 21. The optical element 3 on the left-hand side is a lens having a standard diameter whereas the optical element 3 on the right-hand side is a lens having a non-standard geometry. This particular lens is inserted inside an adapter ring 31b which cooperates with flexible elastic elements 24 so as to hold said lens inside the opening 23 of the sheet carrier 21 at the same level as the lens on the left-hand side. A dashed horizontal line A helps visualizing said level on which both lenses are aligned.

In an alternative not shown, a mounting tool can be used to move the flexible elastic elements 24 in order to open them up and to place the optical element 3 at the same level as the shoulder of the opening 23. Such a mechanical mounting tool may comprise a baseplate with one or more pins configured to engage with the flexible elastic elements 24 in order to facilitate the insertion of the optical element 3 inside the adapter ring 31b. For instance, an operator can place the adapter ring 31b on the base plate so that the pins come into contact with the flexible elastic elements 24. The operator then places an optical element 3 on top of the flexible elastic elements 24 inside the adapter ring 31b. The operator then moves the assembly formed by the adapter ring 31b, the flexible elastic elements 24 and the optical element 3 relative to the baseplate so that the pins on the base plate of the mounting tool bend the flexible elastic elements 24 in an opening-up movement. The outer edges of the optical element 3 then snap into place, so as to be held by the inner support portion 35 formed by the tip of the flexible elastic elements 24 at the right level. The operator can then separate the assembly formed by the adapter ring 31b which holds the optical element 3 by the means of the flexible elastic elements 24 from the mounting tool. The same mounting tool may be used in a reverse manner in order to extract the optical element 3 from the flexible elastic elements 24 within the adapter ring 31b.

It is therefore possible to provide an adapter ring 31b with an improved design for holding optical elements 3 having a non-standard diameter within the sheet carrier 21 while ensuring that the distance from the vaporization source 9 to the surface of these optical elements 3 placed in the adapter ring 31b is the same as for optical elements 3 placed directly in an opening 23 of the sheet carrier 21 of the optical element holder 11.

LIST OF REFERENCES

3—Optical elements
5—Coating station
7—Vacuum chamber
8—Vacuum pump system
9—Vaporization source
10—Arrow
11—Optical elements holder device
13—Top wall
15—Rotation axis
17—Drive Motor
19—Arrows
21—Sheet carrier
23—Individual openings
24—Elastic elements
25—Shoulder
31a—Adapter ring known from the prior art
31b—Adapter ring according to the invention
33—Outer portion
35—Support portion
37—Face
39—Circumferential groove
Do—Diameter of the individual opening
Dext—External diameter of the adapter ring
Dint—Internal Diameter of the adapter ring
Dso—Diameter of the shoulder in the individual opening
Dsa—Diameter of the shoulder of the inner support portion of the adapter ring
H—Height
D—Depth

The invention claimed is:

1. An optical elements holder device for a coating station comprising:
at least one sheet carrier having individual openings, an inner surface of each of said individual openings having at least one shoulder configured to hold an optical element during a coating procedure, said at least one sheet carrier presenting the shape of a dome or a part of a dome which is mounted above a vaporization source so that the optical element is oriented towards said vaporization source; and
at least one adapter ring comprising an outer portion configured to be supported by the at least one shoulder of one of the individual openings of the at least one sheet carrier and wherein the at least one adapter ring also comprises an inner support portion having a face configured to support the optical element having a diameter smaller than the diameter of one of the individual openings, where when the at least one adapter ring is inserted in one of the individual openings of the at least one sheet carrier, the face of the inner support portion of the at least one adapter ring is at the same level as the at least one shoulder of one of the individual openings of the at least one sheet carrier.

2. The optical elements holder device according to claim 1, wherein the inner support portion comprises at least one shoulder, which presents a face for supporting at least part of the outer edge of the optical element, said face being at the same level as the at least one shoulder of one of the individual openings of the at least one sheet carrier when the at least one adapter ring is inserted in one of the individual openings.

3. The optical elements holder device according to claim 2, wherein the width of the face of a shoulder-shaped inner support portion of the at least one adapter ring is larger than or equal to the width of the outer portion of the at least one adapter ring.

4. The optical elements holder device according to claim 1, wherein the height of the at least one adapter ring is less than or equal to the depth of one of the individual openings of the at least one sheet carrier in which the at least one adapter ring is mounted.

5. The optical elements holder device according to claim 1, wherein the optical elements holder device comprises a circumferential groove on the outer portion of the at least one adapter ring.

6. The optical elements holder device according to claim 1, wherein the inner support portion comprises several sections that protrude towards the centre of the at least one adapter ring.

7. The optical elements holder device according to claim 1, wherein the inner support portion is circular and continuous around an inner periphery of the at least one adapter ring.

8. The optical elements holder device according to claim 1, wherein the at least one adapter ring is configured to cooperate with flexible elastic elements so as to hold the optical element having a non-standard geometry, wherein tips of the flexible elastic elements form the inner support portion configured to support the optical element at the same level as the at least one shoulder of one of the individual openings of the at least one sheet carrier.

9. The optical elements holder device according to claim 1, wherein the face of the inner support portion of the at least one adapter ring is coplanar with the at least one shoulder of one of the individual openings of the at least one sheet carrier.

* * * * *